United States Patent [19]

Saran

[11] Patent Number: 4,790,983
[45] Date of Patent: Dec. 13, 1988

[54] HIGH ABSORBTIVITY SODIUM TRIPOLYPHOSPHATE

[75] Inventor: Mohan S. Saran, Grand Island, N.Y.
[73] Assignee: Occidental Chemical Corporation, Niagara Falls, N.Y.
[21] Appl. No.: 41,966
[22] Filed: Apr. 24, 1987
[51] Int. Cl.$^4$ .................. C01B 15/16; C01B 25/26
[52] U.S. Cl. ................................ 423/315; 423/305
[58] Field of Search .......................... 423/315, 305

[56] References Cited

U.S. PATENT DOCUMENTS

| | | | |
|---|---|---|---|
| 3,761,573 | 9/1973 | Hinz et al. | 423/315 |
| 3,770,644 | 11/1973 | Huttinger et al. | 423/315 |
| 3,932,590 | 1/1976 | Pals et al. | 423/315 |
| 4,251,498 | 2/1981 | Hensler et al. | 423/315 |

*Primary Examiner*—Gregory A. Heller
*Attorney, Agent, or Firm*—James F. Tao; William G. Gosz

[57] ABSTRACT

High absorbtivity sodium tripolyphosphate is prepared by moisturizing the anhydrous orthophosphate particles produced by spray-drying an aqueous solution of sodium phosphates during the production of sodium tripolyphosphate. Following moisturization, the hydrated particles are calcined at a temperature within the range of from about 300° C. to about 600° C. to produce a granular sodium tripolyphosphate product having an absorbtivity value of at least about 30%.

3 Claims, No Drawings

HIGH ABSORBTIVITY SODIUM TRIPOLYPHOSPHATE

BACKGROUND OF THE INVENTION

This invention relates to a process for preparing high absorbtivity sodium tripolyphosphate (STPP) particles by a simple modification of existing processing equipment which is currently used commercially to manufacture sodium tripolyphosphate.

Sodium tripolyphosphate is widely used in the formulation of modern detergent compositions where it acts as a phosphate builder, increasing the cleaning ability of the detergent composition.

A key property of sodium tripolyphosphate in this application is its ability to absorb various liquid components used in the formulation of detergents, such as surfactants. Absorbtivity is the measure of the ability of the sodium tripolyphosphate to soak up liquids without getting wet, and is expressed as the weight percent of Triton ® X-100 which can be absorbed by the material without losing its free flowing properties. High absorbtivity values are beneficial for formulating free-flowing detergent compositions containing liquid surfactants, such as dry-mixed automatic dishwashing compositions. Such high absorbtivities allow the detergent compositions to incorporate greater amounts of surfactants without lumping or caking. Sodium tripolyphosphate compositions having this characteristic impart greater cleaning power to detergents since they are capable of absorbing and retaining large quantities of surfactants without forming lumps during the agglomeration or dry-blending manufacturing operation.

Typical grades of commercial sodium tripolyphosphates generally have absorbtivity values of between about 6% and 20%, depending on the density of the material, with the absorbtivity generally increasing as the density is decreased. Although absorbtivity values in this range are satisfactory for many applications, the performance of modern detergent compositions is continually being upgraded, and consequently, it would be desirable to increase the absorbtivity even further to enhance the performance of these materials.

Sodium tripolyphosphate is produced commercially from an aqueous solution of monosodium phosphate and disodium phosphate, which can be prepared by reacting phosphoric acid with sodium hydroxide or sodium carbonate. This "wet mix" is typically spray-dried to produce granules of dehydrated sodium orthophosphate. The sodium orthophosphate is then converted to sodium tripolyphosphate by calcining the particles at elevated temperatures of from 300° C. to 600° C.

Various techniques have been proposed for increasing the absorbtivity of sodium tripolyphosphate. Two such techniques are disclosed in U.S. Pat. Nos. 4,251,498 and 4,255,274, both to Hensler et al. In U.S. Pat. No. 4,255,274, a dense sodium tripolyphosphate particulate mixture having a bulk density of at least 56 lbs./ft.³ is moisturized by the addition of 10% by weight moisture to the particles, and these particles are then calcined at elevated temperatures to produce STPP particles having absorbtivities of up to 22.4%. U.S. Pat. No. 4,251,498 is an application of the previous process to undersized STPP particles, which are first compacted and milled prior to moisturization and calcining. This process is effective to produce an STPP product having an absorbtivity of up to 22.1%.

As will be appreciated by those skilled in the art, it would be desirable to increase the absorbtivity of sodium tripolyphosphate to even higher levels than achievable using existing technology using a relatively inexpensive modification to existing processing equipment used to manufacture commercial STPP.

SUMMARY OF THE INVENTION

In accordance with the present invention, a process is provided for preparing a sodium tripolyphosphate particulate mixture having an absorbtivity of at least about 25%, and preferably at least about 30%. This is accomplished by modifying a commercial sodium tripolyphosphate manufacturing process by moisturizing anhydrous sodium orthophosphate particles to a moisture content of between about 15% to about 25% after flash-drying the wet mix. The hydrated orthophosphate particles are then calcined at a temperature from about 300° C. to about 600° C. to prepare high absorbtivity sodium tripolyphosphate particles.

DETAILED DESCRIPTION OF THE INVENTION

The process of the present invention involves the steps of:

(1) forming an aqueous solution of sodium monophosphate and sodium diphosphate by reacting phosphoric acid with sodium hydroxide and/or sodium carbonate, (2) flash-drying the aqueous sodium phosphate solution, or wet mix, at a temperature in the range of about 150° C. to about 250° C. to form anhydrous orthophosphate particles, (3) moisturizing the anhydrous orthophosphate particles to a moisture content of between about 15% to about 25% to prepare hydrated particles, (4) calcining the hydrated particles at a temperature from about 300° C. to about 600° C. to remove water, and (5) recovering sodium tripolyphosphate particles having an absorbtivity of at least about 25%.

The wet-mix solution of sodium monophosphate and sodium diphosphate is prepared by neutralizing phosphoric acid with sodium hydroxide and/or sodium carbonate. The sodium to phosphorus mole ratio is adjusted to about 5:3 by the addition of sodium hydroxide to obtain sodium tripolyphosphate as shown by the following formula:

$$2Na_2HPO_4 + NaH_2PO_4 \rightarrow Na_5P_3O_{10} + 2H_2O$$

The wet-mix is flash-dried to prepare anhydrous particles of sodium orthophosphate. Flash-drying can be accomplished using a variety of conventional processing equipment such as a drum dryer or a spray dryer. The drying temperature should be maintained in the range of from about 150° C. to about 250° C. to insure rapid removal of water from the wet-mix.

The anhydrous orthophosphate particles are next moisturized by the addition of water at levels of between about 15% to about 25% by weight of the particles. Moisturization is conveniently accomplished by spraying the particles with water using any conventional spraying means. The particles may advantageously be agitated during moisturization. Other means of moisturizing are not precluded, however, as described in U.S. Pat. No. 4,255,274, issued Mar. 10, 1981 to Hensler et al., the disclosure of which is incorporated by reference herein.

After moisturization, the hydrated particles are calcined to a temperature of from about 300° C. to about 600° C. to remove the water. Calcining converts the sodium orthophosphate particles into particles of sodium tripolyphosphate. The calcining temperature should be sufficiently high to dehydrate the orthophosphate particles and avoid the presence of unconverted acid orthophosphates in the final product.

Finally, particles of sodium tripolyphosphate having an absorbtivity of at least about 25% are recovered as the final step of the process. Particles of the desired fineness are obtained by screening and/or milling the product in accordance with known procedures.

It has been found that the use of spray-dried sodium orthophosphate as a feed instead of sodium tripolyphosphate to produce high absorbtivity material is particularly advantageous since it eliminates the use of two calcining steps which would be required if sodium tripolyphosphate were used as the feed as required in U.S. Pat. Nos. 4,251,498 or 4,255,274.

It has also been found that increasing the moisturization level of the feed material results in an increase in absorbtivity and a decrease in bulk density of the recovered product. It is believed that the increase in absorbtivity is due to the evaporation of water of crystallization which opens the pores of the spray-dried beads. In fact, microscopic examination of the moisturized feed and the calcined material indicates that the bead structure remains intact. On the other hand, sodium tripolyphosphate loses its bead structure on hydration in solution, and the calcined sodium tripolyphosphate produced from this feed is powdery.

The following examples are intended to further illustrate the various aspects of the invention without being limited thereby. Various modifications can be made in the invention without departing from the spirit and scope thereof, as will be readily appreciated by those skilled in the art. Such modifications and variations are within the purview and scope of the appended claims.

EXAMPLE 1

Sodium orthophosphate spray tower discharge was sprayed with water in a stainless steel drum rotated at about 10 rpm. After the material was moisturized to a mosiure content of 19.7%, the moisturized material was calcined by heating the rotating drum to approximately 420° C. to 440° C. for ½ hour. The product was cooled to room temperature. Coarser material was screened out using a U.S. 20 mesh screen, and the physical properties of the product which went through the 20 mesh screen were determined. The final product had a bulk density of 37.5 lbs./ft.$^3$ and an absorbtivity of 41%.

EXAMPLE 2

The procedure of Example 1 was repeated by moisturizing sodium orthophosphate spray tower discharge to a moisture content of 22% to 23%, and calcining the moisturized material at 440° C. for ½ hour. The bulk density of the final material was 33.4 lbs./ft.$^3$, and the absorbtivity was 32%.

EXAMPLE 3

The procedure of Example 1 was repeated by moisturizing sodium orthophosphate spray tower discharge to a moisture content of 14.3%, and calcining the moisturized material at about 375° C. for ½ hour. The bulk density of the final material was 34.3 lbs./ft.$^3$, and the absorbtivity was 22.4%.

What is claimed is:

1. A process for preparing sodium tripolyphosphate particles having an absorbtivity of at least about 25%, said process consisting essentially of the steps of
   (a) forming an aqueous solution of sodium phosphates by reacting phosphoric acid with sodium hydroxide or sodium carbonate,
   (b) flash drying the aqueous sodium phosphate solution at a temperature in the range of from about 150° C. to about 250° C. to form anhydrous sodium orthophosphate particles,
   (c) moisturizing the anhydrous sodium orthophosphate particles to a moisture content of between about 15% to about 25% to prepare hydrated sodium phosphate particles,
   (d) calcining the hydrated particles at a temperature of from about 300° C. to about 600° C. to remove water and to convert sodium orthophosphate particles into particles of sodium tripolyphosphate, and
   (e) recovering particles of sodium tripolyphosphate having an absorbtivity of at least about 25%.

2. The process of claim 1 wherein the absorbtivity of the sodium tripolyphosphate particles is at least about 30%.

3. A granular sodium tripolyphosphate material having an absorbtivity of at least about 30%.

* * * * *